United States Patent
Rolion et al.

(10) Patent No.: US 9,662,927 B2
(45) Date of Patent: May 30, 2017

(54) STRUCTURE FOR MOUNTING A CLIP FOR A WRITING IMPLEMENT

(71) Applicant: Societe BIC, Clichy (FR)

(72) Inventors: Franck Rolion, Asnieres sur Oise (FR); Ludovic Fagu, Noisy le Sec (FR)

(73) Assignee: SOCIÉTÉ BIC, Clichy (FR)

( * ) Notice: Subject to any disclaimer, the term of this patent is extended or adjusted under 35 U.S.C. 154(b) by 104 days.

(21) Appl. No.: 14/385,245

(22) PCT Filed: Mar. 8, 2013

(86) PCT No.: PCT/FR2013/050492
§ 371 (c)(1),
(2) Date: Sep. 15, 2014

(87) PCT Pub. No.: WO2013/136000
PCT Pub. Date: Sep. 19, 2013

(65) Prior Publication Data
US 2015/0050064 A1  Feb. 19, 2015

(30) Foreign Application Priority Data

Mar. 16, 2012 (FR) ...................... 12 52405

(51) Int. Cl.
*B43K 7/12* (2006.01)
*B43K 25/02* (2006.01)
*B43K 7/00* (2006.01)
*F16B 2/22* (2006.01)

(52) U.S. Cl.
CPC .............. *B43K 25/02* (2013.01); *B43K 7/005* (2013.01); *B43K 25/022* (2013.01); *B43K 25/024* (2013.01); *F16B 2/22* (2013.01); *Y10T 24/135* (2015.01)

(58) Field of Classification Search
CPC ..... B43K 25/02; B43K 25/022; B43K 25/024
USPC .................................. 401/104, 105; 24/11 M
See application file for complete search history.

(56) References Cited

U.S. PATENT DOCUMENTS

| 5,336,006 A | 8/1994 | Badr et al. |
| 5,535,487 A | 7/1996 | Kageyama et al. |
| 6,308,380 B1 | 10/2001 | Cheng |
| 7,527,448 B2 * | 5/2009 | Ono ...................... B43K 25/02 24/11 M |
| 8,425,135 B2 * | 4/2013 | Rolion ................... B43K 15/00 401/131 |
| 2004/0099777 A1 | 5/2004 | Fujihara et al. |
| 2006/0053595 A1 | 3/2006 | Kageyama et al. |

FOREIGN PATENT DOCUMENTS

| DE | 90 04 577 U1 | 4/1990 |
| EP | 0 979 740 B1 | 4/2003 |
| FR | 947066 | 5/1947 |

* cited by examiner

*Primary Examiner* — Jennifer C Chiang
(74) *Attorney, Agent, or Firm* — Polsinelli PC (57) ABSTRACT

A structure for mounting a clip for a writing implement that includes (i) a pivotable clip which includes a stationary coupling portion extending along a reference axis; a main body that is pivotable in a pivot plane containing the reference axis, having two sidewalls each comprising a pivot-limiting hook; and a resiliently deformable curved portion connecting the main body to the coupling portion, enabling the main body to pivot relative to the coupling portion; (ii) a receiving member for receiving the coupling portion of the clip.

18 Claims, 5 Drawing Sheets

STRUCTURE FOR MOUNTING A CLIP FOR A WRITING IMPLEMENT

CROSS REFERENCE TO RELATED APPLICATIONS

This application is a national stage application of International Application No. PCT/FR2013/050492, filed on Mar. 8, 2013, which claims the benefit of French Patent Application No. 1252405, filed on Mar. 16, 2012, the entire contents of both applications being incorporated herein by reference.

BACKGROUND OF THE INVENTION

Field of the Invention

The embodiments of the present invention generally relate to a structure for mounting a clip for a writing implement comprising a pivotable clip which comprises a stationary coupling portion extending along a reference axis, a main body that is pivotable in a pivot plane containing the reference axis, the main body having two sidewalls which each comprise a pivot-limiting hook, and a resiliently deformable curved portion connecting the main body to the coupling portion, the writing implement further comprising a receiving member adapted to receive the coupling portion of the clip, the receiving member comprising at least one pivot stop adapted to cooperate with the pivot-limiting hook to limit the pivoting of the main body of the clip.

Description of the Related Art

Such a mounting structure is known in particular from the publication of French patent no. 947,066, which discloses a structure for mounting a clip on a receiving member consisting of a portion of the wall of a cap. In a first embodiment of the structure (FIGS. 1-3), the wall of the cap has an opening for inserting the two sidewalls of the main body and the coupling portion which extends the flexible curved portion of the clip. In this manner, the coupling portion of the clip abuts continuously against the inner wall surface, and an edge of the opening forms an abutment to stop the pivot-limiting hooks of the clip.

This device has disadvantages, however. In particular, the mounting of the clip on the receiving member is made difficult by the need to keep the flexible coupling portion of the clip bent away from the main body of the clip during assembly. In addition, it is difficult in practice to introduce both sides of the clip into the opening because of the pivot-limiting hooks which must pass under the wall of the cap. Also, once assembled, the coupling portion of the clip simply rests against the wall of the cap and is not specifically prevented from moving on this wall, which can cause problems with stability of the coupling portion during use of the clip. It is also stated in the document that an aim of the structure is to facilitate removal of the clip (lines 69-71). This objective clearly does not lead to a stable mounting of the clip.

The embodiments of the present invention seek to overcome these disadvantages. To do so, the embodiments of the present invention relate in particular to providing a structure for mounting a clip that allows for stable and easy clip mounting.

To this end, an object of the embodiments of the present invention is a structure for mounting a clip as defined above, characterized in that the abutment member is arranged between the two sidewalls of the main body of the clip and in addition has two lateral abutments adapted to prevent movement of the main body perpendicularly to the pivot plane.

With these arrangements, the assembly is made stable in particular through the lateral retention of the main body of the clip provided by the two lateral abutments of the abutment member. In addition, these arrangements facilitate assembly compared to a device such as the one disclosed in the aforementioned French patent no. 947,066.

In preferred embodiments of a structure for mounting a clip according to the invention, one or more of the following arrangements may be used:

the two lateral abutments are formed by two side surfaces of the abutment portion which are located one on each side of the pivot plane, and the two pivot stops are each formed by a surface which advances towards the pivot plane from an edge of the side surface; thereby allowing easy molding of the lateral abutments and pivot stops;

at least the sidewalls of the clip are formed from a metal sheet, and each pivot-limiting hook is formed by a tab of the metal sheet bent at an edge of a sidewall so that it protrudes in the direction of the pivot plane; thereby allowing easy creation of solid hooks that can have a relatively large contact area and allowing clip sidewalls that are relatively low in height;

the receiving member comprises a base comprising two lateral walls and an upper wall which interconnects the two lateral walls, the receiving member further comprising a retaining opening formed between the two lateral walls and with which the coupling portion of the clip is engaged and immobilized; thereby facilitating assembly and retention of the clip;

the upper wall of the base comprises a reinforcing transverse portion at an entrance of the retaining opening, the reinforcing transverse portion having two side faces which define a width less than a width of the abutment member and substantially equal to a distance between two the pivot-limiting hooks; thereby increasing the strength of the base without compromising ease of clip mounting;

the upper wall comprises protrusions projecting inwardly into the retaining opening, the protrusions being in contact with a face of the coupling portion of the clip so as to prevent movement of the coupling portion within the pivot plane; thereby reinforcing the stability of the coupling portion of the clip within the retaining opening along the pivot plane;

the coupling portion of the clip comprises a flexible catch member, and the receiving member comprises a catch opening adjacent to the retaining opening and with which the flexible catch member engages; thereby reinforcing the stability of the coupling portion of the clip within the retaining opening along the reference axis and preventing removal of the clip;

the receiving member comprises a reinforcing front wall which extends substantially perpendicularly to the reference axis, the at least one pivot stop projecting from a rear face of the reinforcing front wall; thereby increasing the strength of each pivot stop; the reinforcing front wall comprises a projecting upper part forming an abutment against which a lower surface of the main body of the clip comes in contact when the clip is not under load; thereby preventing the pivot-limiting hooks from bearing on the receiving member if pressure directed towards the receiving member is exerted on the clip;

The embodiments of the present invention also relate to a writing implement comprising a barrel extending along a longitudinal axis and a structure for mounting a clip according to the invention, wherein the receiving member of the mounting structure is integrally formed with a generally tubular member mounted at the rear of the barrel and extending along the longitudinal axis, the generally tubular member comprising a generally cylindrical rear portion from which the receiving member protrudes, the rear portion comprising a wall portion which has an outer surface against which the coupling portion of the clip comes in contact; thereby allowing easy mounting of the clip on the receiving member without encroaching upon the inside space of the generally tubular member.

The embodiments of the present invention also relate to a clip for a writing implement comprising a coupling portion, a main body, and a resiliently deformable curved portion connecting the main body to the coupling portion, the main body having two sidewalls each comprising a pivot-limiting hook, characterized in that the clip further comprises a flexible catch member formed with the coupling portion, and in that at least the sidewalls are formed from a metal sheet and each of the two pivot-limiting hooks is formed by a tab of the metal sheet bent at an edge of the sidewall so that it protrudes in the direction of the other pivot-limiting hook.

Other features and advantages will be apparent from the following description of some non-limiting exemplary embodiments, with reference to the drawings in which.

Figure 1:
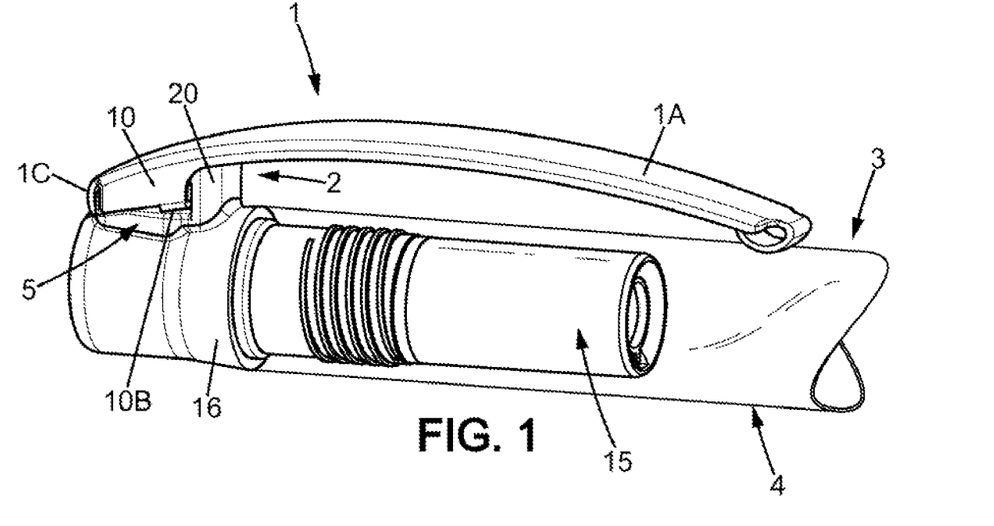
FIG. 1 is a side perspective view of a mounting structure according to a first embodiment of the invention, the mounting structure being installed at the rear of a barrel of a writing implement.

According to a first embodiment of a mounting structure according to the embodiments of the present invention, the mounting structure shown in FIG. 1 comprises a receiving member 2 integrally formed with a generally tubular member 15. The generally tubular member 15 is adapted for mounting at the rear of a barrel 4 of a writing implement 3, as is also represented in FIG. 1. The generally tubular member comprises a generally cylindrical rear portion 16 positioned at the rear of the barrel 4 as an extension of the latter once the member 15 is mounted on the barrel. The receiving member 2 radially projects from the rear portion 16.

The clip 1 comprises a main body 1A and a resiliently deformable curved portion 1C connecting the main body 1A to a coupling portion inserted into a base 5 of the receiving member.

The receiving member 2 comprises an abutment member 20 having at least one pivot stop adapted to cooperate with a pivot-limiting hook 10B provided on a sidewall 10 of the clip 1 so as to limit the pivoting of the main body 1A.

Figure 2:
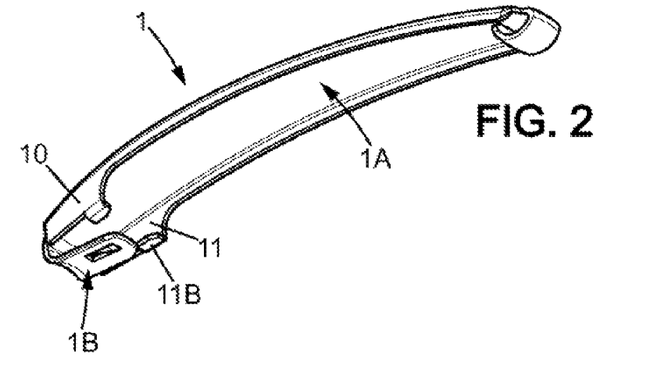
FIG. 2 is a bottom perspective view of the clip of the mounting structure of FIG. 1
Figure 3:
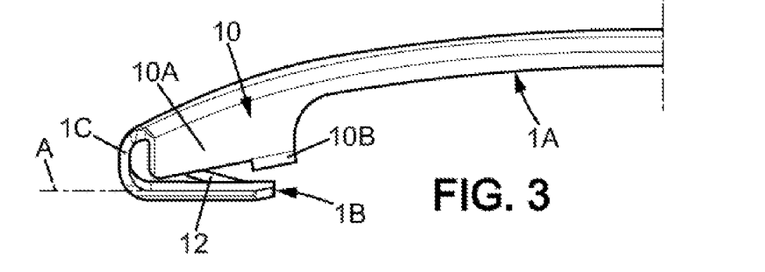
FIG. 3 is a partial side view of the clip of FIG. 2.
Figure 4:
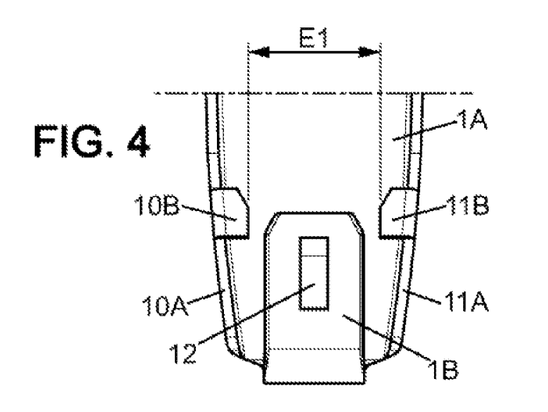
FIG. 4 is a partial bottom view of the clip of FIG. 2.

As shown in greater detail in FIG. 2, FIG. 3 and FIG. 4, the coupling portion 1B of the clip 1 extends along a reference axis A. The main body 1A of the clip has two sidewalls 10 and 11, and the resiliently deformable curved portion 1C of the clip has a pivot function with elastic return allowing the main body 1A to pivot relative to the coupling portion 1B. Each sidewall 10, 11 comprises a pivot-limiting hook 10B, 11B. At least the sidewalls 10 and 11 of the clip are formed from a metal sheet, and each pivot-limiting hook is formed by a tab of this metal sheet which is bent at an edge of a sidewall so that it protrudes in the direction of the other pivot-limiting hook. A distance E1 greater than the width of the coupling portion 1B is provided between the two pivot-limiting hooks 10B and 11B.

Advantageously, the main body 1A, the coupling portion 1B, and the curved portion 1C of the clip are formed from a single metal sheet of uniform thickness, this sheet being resiliently deformable to a certain extent especially at the curved portion 1C of the clip. The clip of a mounting structure according to the invention is not limited to this embodiment, however.

Both pivot-limiting hooks 10B and 11B lie in a same plane substantially perpendicular to a flat portion 10A, 11A of each sidewall 10, 11 (FIG. 2). This particular arrangement has the advantage of limiting the height of the hooks, meaning their size in the direction perpendicular to the reference axis A of the coupling portion 1B, and therefore allows limiting the height the clip. The plane of the hooks is parallel to the lower edges of the flat portions 10A and 11A of the sidewalls, and is inclined by between 5° and 15° relative to the reference axis A. However, an incline of zero or near zero is possible.

The clip advantageously comprises a flexible catch member 12, formed by a sheet metal tab cut out from the coupling portion 1B and curved so as to protrude towards the main body 1A. The tab 12 is inclined with respect to the reference axis A so that when the coupling portion 1B of the clip is inserted into an appropriate retaining opening 7 (FIG. 4) provided in the receiving member 2, the tab bends as it is slid against a wall of the retaining opening until it relaxes in a catch opening 8 where it returns to its initial inclination and serves as an abutment member, as explained below with reference to FIG. 6.

However, the flexible catch member 12 is not essential in a mounting structure according to the invention. It is possible to do without such a flexible member and alternatively provide sawtooth cuts on the lateral edges of the coupling portion 1b of the clip, in order to immobilize the coupling portion in the direction of the reference axis A within the retaining opening arranged in the receiving member 2.

Figure 5:
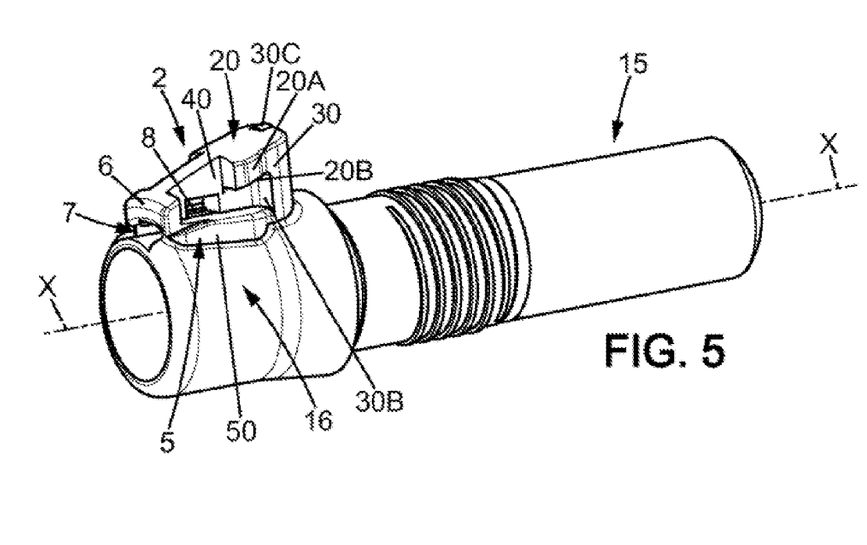
FIG. 5 is a perspective view of the receiving member of the mounting structure of FIG. 1, the receiving member being integrally formed with a tubular member intended for mounting at the rear of a barrel.

As represented in FIG. 4 and FIG. 5, the receiving member 2 of the mounting structure is integrally formed with a generally tubular member 15 intended for mounting at the rear of the barrel of a writing implement 3 (FIG. 1). The generally tubular member 15 extends along a longitudinal axis X coincident with the longitudinal axis of the barrel 4 of the writing implement once the member 15 is mounted on the barrel. The receiving member 2 comprises an abutment member 20 having two laterally opposite pivot stops each adapted to cooperate with a pivot-limiting hook 10B or 11B in order to limit the pivoting of the main body 1A of the clip. A first pivot stop 20B, located on the right side of the abutment member 20 if facing towards the front of the tubular member 15, is visible in FIG. 4. The mounting structure is symmetrical about a longitudinal plane P1 (FIG. 4) passing through the longitudinal axis X of the tubular member. As detailed below, the longitudinal plane P1 is a pivot plane for the main body 1A of the clip. The abutment member 20 further comprises two lateral abutments 20A and 21A adapted to prevent movement of the main body 1A perpendicular to its pivot plane P1.

Each lateral abutment 20A, 21A is formed by a lateral surface of the abutment member 20, and each pivot stop is formed by a surface which advances towards the longitudinal plane P1 from an edge of one of the lateral surfaces. A second pivot stop 21B, located on the left side of the abutment member 20 and symmetrical with the first pivot stop 20B relative to the longitudinal plane P1, can be seen in FIG. 7. In the present embodiment where the two pivot-limiting hooks 10B and 11B of the clip lie within the same plane, the two surfaces forming the pivot stops 20B and 21B preferably also lie within a same plane so that the contact area acting as the stop between the hooks and pivot stops is optimized.

Figure 7:
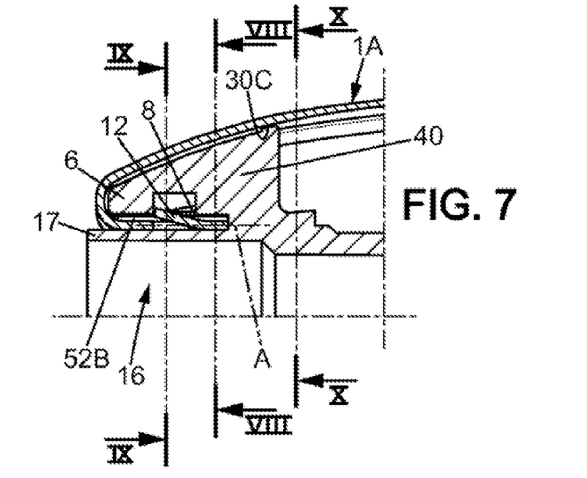
FIG. 7 is a partial longitudinal section view of the mounting structure of the first embodiment of the invention, where the section is taken in the pivot plane of the clip.

The plane of the pivot stops is advantageously inclined relative to the reference axis A, with an inclination arranged so that the plane of the hooks coincides with the plane of the stops when the hooks are in abutment, thereby allowing flat contact between each hook and the corresponding pivot stop. A relatively large contact area in abutment makes it possible to avoid local deformation of a pivot stop or hook during normal use of the clip. In particular, if the receiving member 2 is made of plastic, the above structure of the pivot-limiting hooks is very advantageous for preventing deformation of the pivot stops.

The receiving member 2 further comprises a central longitudinal wall 40 which extends along the longitudinal plane P1, and a reinforcing front wall 30 which reinforces the mechanical strength of the abutment member 20 and extends substantially perpendicularly to the longitudinal axis X of the generally tubular member 15. The front wall 30 has a rear face 30B. A pivot stop 20B, 21B, and the lateral abutment 20a, 21a on the same side of the abutment member 20, are formed by a single protruding portion of the abutment member 20 which projects longitudinally rearwards 30B from the front wall 30 and projects laterally outward from the central longitudinal wall 40.

The receiving member 2 also comprises a base 5 comprising two lateral walls 50 and 51 symmetrical with each other relative to the longitudinal plane P1, the base further comprising an upper wall 52 which interconnects the two lateral walls (FIG. 5). A retaining opening 7 is formed between the two lateral walls, into which the coupling portion 1B of the clip is arranged for engaging and immobilizing purposes, and which has an entrance at a rear end of the receiving member 2. The upper wall 52 comprises a transverse reinforcing portion 6 at the entrance of the retaining opening 7, having two side faces 60 and 61 symmetrical with each other relative to the longitudinal plane P1 and which define a width L1 of the transverse portion 6. This width L1 is less than a width L2 defined between the lateral abutments 20A and 21A of the abutment member, and is substantially equal to the distance E1 separating the two hooks of the clip (FIG. 3).

Figure 6:
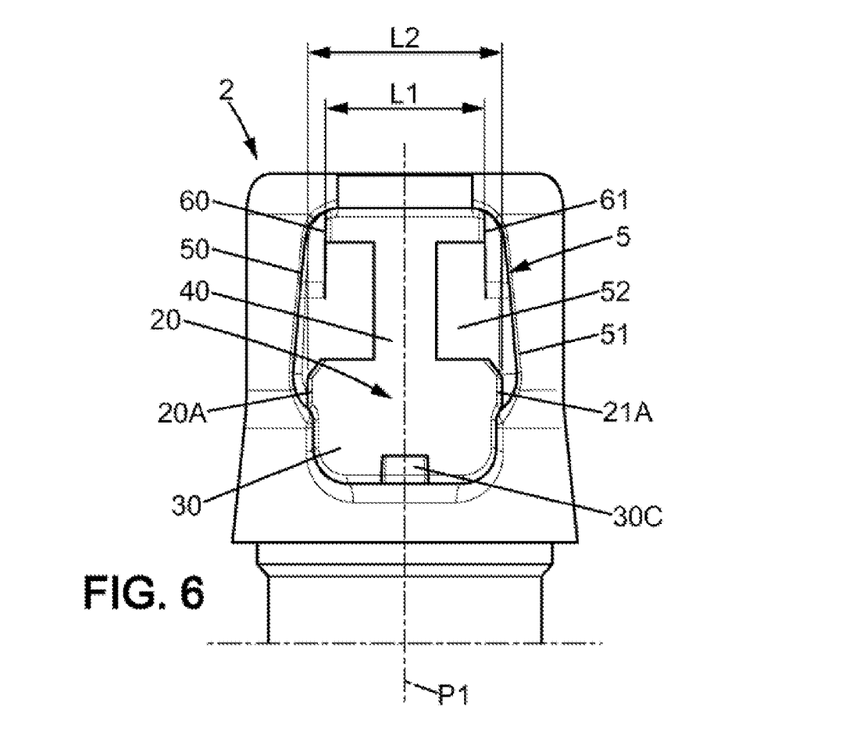
FIG. 6 is a partial top view of the receiving member of FIG. 5.

It should be noted with reference to FIG. 3 that each pivot-limiting hook 10B, 11B is preferably beveled at the front, to facilitate inserting the clip and centering it with respect to the longitudinal plane P1. The distance E1 separating the two hooks 10B and 11B maybe strictly equal to the width L1 of the transverse portion 6 or somewhat less than this width L1 since the elastic deformation of the metal sheet forming the sidewalls 10 and 11 of the clip allows the two hooks to be slightly apart when mounting the clip in order to pass beyond the transverse portion 6. In addition, the reinforcing front wall 30 comprises an upper protruding portion 30C forming an abutment (FIG. 4, FIG. 5). As can be seen in FIG. 6, a lower surface of the main body 1A of the clip comes into contact with this abutment 30C when the clip is not under load.

FIGS. 6 to 10 show various views of the first embodiment of the mounting structure in the same at-rest position of the clip, meaning when the clip is not under load, and are described together in the following. The retaining opening 7 is formed in the receiving member 2 so that the reference axis A of the coupling portion 1B of the clip is substantially parallel to the longitudinal axis X of the generally tubular member 15 (FIG. 6). However, an opening 7 adapted for a reference axis A inclined relative to the longitudinal axis is possible. The catch opening 8 is adjacent to the retaining opening 7 so as to receive the flexible catch member 12 of the clip, and is laterally open at both sides so that it forms a hole through the central longitudinal wall 40 (FIG. 4, FIG. 6), which allows unmolding the catch opening 8 from two half-molds symmetrical about the longitudinal plane and used to mold the receiving member 2 with the generally tubular body 15.

Figure 8:
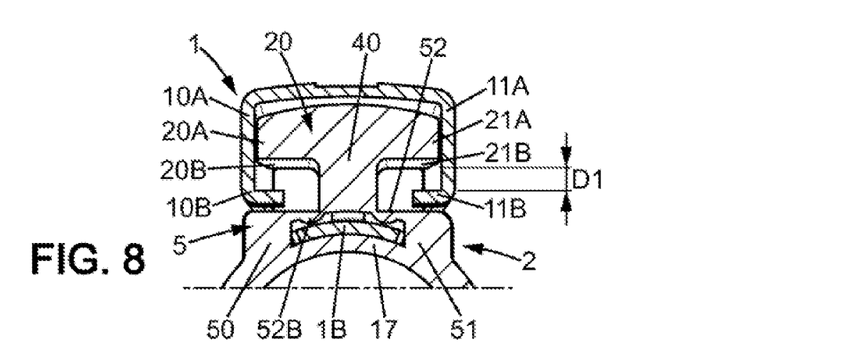
FIG. 8 shows a transverse section view of the mounting structure of FIG. 7, along sectional plane VIII-VIII shown in FIG. 7.

The upper wall 52 of the base 5 of the receiving member 2 advantageously has two flat parts on the top, perpendicular to the central longitudinal wall 40 and on each side thereof (FIG. 4, FIG. 7), to allow unmolding it from two symmetrical half-molds as mentioned above. The upper wall 52 comprises protrusions 52B on the bottom which project inwardly into the retaining opening 7 (FIG. 6, FIG. 7, FIG. 8). The protrusions 52B are provided to establish contact with the radially external face of the coupling portion 1b of the clip relative to the longitudinal axis, so as to immobilize the coupling portion 1B in the radial direction, or in other words to prevent movement of the coupling portion within the pivot plane of the main body 1A of the clip. The protrusions 2B are advantageously in the form of two rounded longitudinal ribs symmetrical to each other about the longitudinal plane, on each side of the catch opening 8, which facilitates unmolding the retaining opening 7, for example using a single pin that is pulled rearward parallel to the longitudinal axis.

The generally cylindrical rear portion 16 from which the receiving member 2 projects comprises a wall portion 17 having a radially external surface that is, for example, cylindrical, against which the coupling portion 1B of the clip comes into contact (FIG. 6, FIG. 7, FIG. 8). The coupling portion 1B is preferably curved so as to form a cylindrical metal sheet portion whose radially inner surface is in full contact with the cylindrical radially outer surface of the wall portion 17, which allows arranging the longitudinal ribs 52B as close as possible to the longitudinal axis. Considering manufacturing tolerances, the radial distance between a longitudinal rib 52B and the wall portion 17 may be designed to be slightly less than the thickness of the sheet for the coupling portion 1B, to ensure that the coupling portion 1B is retained in the retaining opening 7 without radial play. For this purpose, a slight elastic deformation of the upper wall 52 at the longitudinal ribs 52B may be provided in the radial direction once the clip is installed, particularly as the upper wall 52 here is preferably relatively thin to provide radial compactness.

Advantageously, the thickness of the wall portion 17 in the radial direction is smaller than the wall thickness of the rear portion 16 in order to bring the retaining hole 7 radially closer to the longitudinal axis, which reduces the overall dimensions of the mounting structure in the radial direction without compromising the inside space of the rear portion 16. The two lateral walls 50 and 51 of the base 5 each have a flat outer surface which extends substantially in the same plane as a flat portion 10A or 11A of a sidewall 10 or 11 of the same lateral side of the clip, which is advantageous for at least the appearance of the mounting structure.

As represented in FIG. 7, when the clip is not under load, a space D1 is provided between each pivot-limiting hook 10B, 11B and the corresponding pivot stop 20B, 21B. With this spacing D1, the user can move the main body 1A of the clip away from the barrel until the hooks 10B and 11B are in abutment, without deformation of the body.

Figure 9:
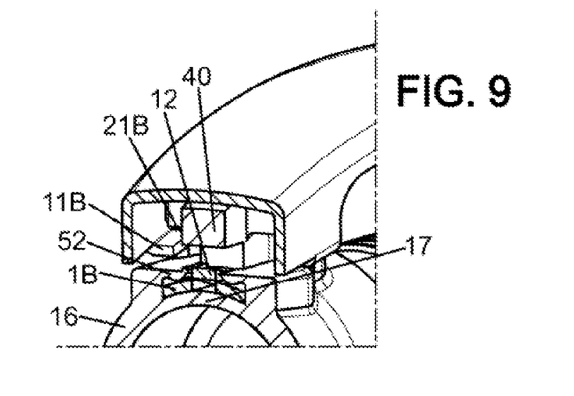
FIG. 9 shows a partial cutaway perspective view of the mounting structure of FIG. 7, viewed toward the front from sectional plane IX-IX shown in FIG. 7.
Figure 10:
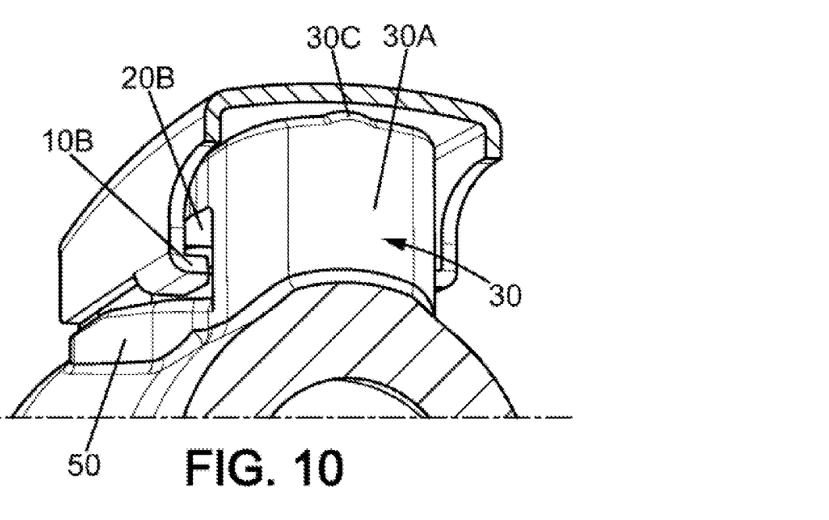
FIG. 10 shows another partial cutaway perspective view of the mounting structure of FIG. 7, viewed toward the rear from the sectional plane X-X shown in FIG. 7.
Figure 11:
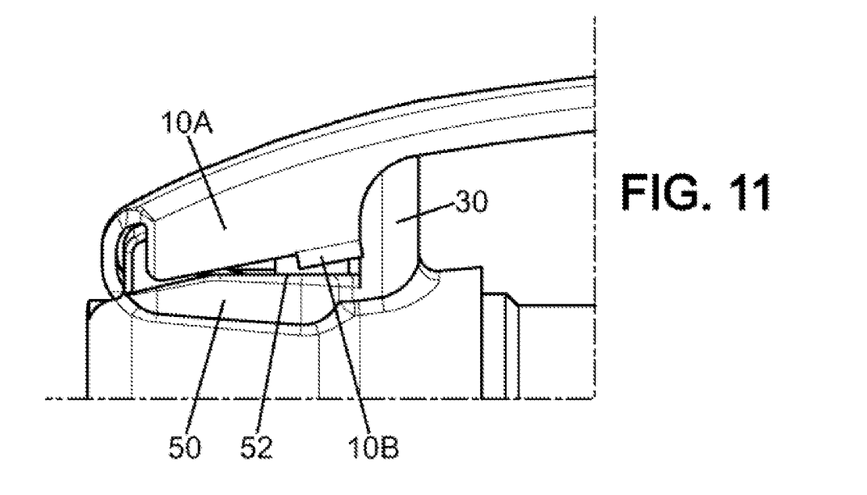
FIG. 11 shows a partial side view of the mounting structure of FIG. 7.

As represented in FIG. 9 and FIG. 10, and taking into account the symmetry of the mounting structure, each pivot-limiting hook 10B, 11B, similarly to each sidewall 10A, 11A, of the clip, is nearly in contact with the upper wall 52 of the base of the receiving member when the clip is not under load. As previously mentioned, the reinforcing front wall of the receiving member 30 comprises a protruding upper part 30C forming an abutment against which a lower surface of the main body 1A of the clip comes in contact when the clip is not under load. This abutment 30C prevents a sidewall 10 or 11 of the clip from bearing against the upper wall 52, even if the clip is pressed against the barrel, and thus avoids the risk of deforming the upper wall 52 particularly near a lower corner of a hook 10B or 11B of the clip. The abutment 30C is advantageously advanced as much as possible so as to reach a front face 30A of the reinforcing front wall 30. The front face 30A is preferably flat with rounded lateral edges, thereby forming a large contact surface for an object inserted under the clip all the way to this face, such as a sheet of paper.

In a second embodiment of a mounting structure according to the embodiments of the present invention, not represented in the figures, it is possible to eliminate the reinforcing front wall 30 and to provide on the abutment member 20 a protruding upper part similar to the abutment 30C described above. It is also possible to eliminate a portion of the central longitudinal wall 40 above the catch opening 8, meaning the transverse reinforcing portion 6 and the abutment member 20 are no longer interconnected by this wall. These arrangements taken together or separately save a small amount of plastic, but may still have the disadvantage of weakening the receiving member 2.

It is understood that a structure for mounting a clip for a writing implement is not necessarily intended to be placed at the rear of the writing implement, and may for example be fitted on a protective cap for a tip at the front of the writing implement.

The invention also relates to an assembly of plastic material for a writing implement, comprising a generally tubular member (15) extending along a longitudinal axis (X) and a receiving member (2) projecting from a wall portion (17) of the generally tubular member (15), the receiving member being adapted to receive a clip and comprising two lateral walls (50, 51) and an upper wall (52) which interconnects the two lateral walls. The receiving member (2) further comprises a retaining opening (7) for fixedly retaining a portion of the clip, the retaining opening being formed between the two lateral walls (50, 51) and between the upper wall (52) and the wall portion (17). The receiving member (2) further comprises a central longitudinal wall (40) extending along a longitudinal plane (P1) which passes through the longitudinal axis (X) and an abutment member (20) having two laterally opposing abutment walls (20A, 21A) one on each side of the central longitudinal wall (40), and the abutment member (20) further comprises two additional stop walls (20B, 21B) substantially perpendicular to the central longitudinal wall (40), one on each side thereof, each the additional stop wall (20B, 21B) being arranged facing the top wall (52).

Some embodiments of an assembly of plastic material according to the embodiments of the present invention may advantageously use one or more of the foregoing arrangements concerning the receiving member of the mounting structure described, possibly in combination. By means of the arrangements for the abovementioned assembly of plastic material, it is possible to mold the receiving member 2 with the generally tubular member 15 using two half-molds that are symmetrical about the longitudinal plane. The unmolding of the retaining opening 7 and a generally cylindrical hollow space of the tubular member 15 can be performed simultaneously, for example using a single pin that is pulled rearward parallel to the longitudinal axis.

It is understood that the generally tubular member of an assembly of plastic material for a writing implement is not necessarily intended to be mounted to the back of the barrel of the writing implement, and may for example consist of a protective cap for a tip at the front of the writing implement.

The invention claimed is:

1. A structure for mounting a clip for a writing implement comprising:
   a pivotable clip which comprises:
      a stationary coupling portion extending along a reference axis;
      a main body adapted to pivot relative to the coupling portion without deformation, in a pivot plane containing the reference axis, the main body having two sidewalls each comprising a pivot-limiting hook; and
      a resiliently deformable curved portion connecting the main body to the coupling portion, a pivoting of the main body leading to a deformation of the curved portion;
   a receiving member receiving the coupling portion of the clip, comprising an abutment member having at least one pivot stop adapted to cooperate with said pivot-limiting hook to limit the pivoting without deformation of the main body, the receiving member comprising a base comprising two lateral walls and an upper wall which interconnects the two lateral walls, the receiving member further comprising a retaining opening formed between the two lateral walls and with which the coupling portion of the clip is engaged and immobilized;
   wherein the abutment member is arranged between the two sidewalls of the main body of the clip and has two lateral abutments adapted to prevent movement of the main body perpendicularly to the pivot plane.

2. The mounting structure according to claim 1, wherein at least the sidewalls of the clip are formed from a metal sheet, and each pivot-limiting hook is formed by a tab of said metal sheet bent at an edge of a sidewall so that the hook protrudes in the direction of the pivot plane.

3. The mounting structure according to claim 2, wherein the receiving member comprises a reinforcing front wall which extends perpendicularly to the reference axis, the one pivot stop projecting from a rear face of the reinforcing front wall.

4. The mounting structure according to claim 1, wherein the upper wall of the base comprises a reinforcing transverse portion at an entrance of the retaining opening, the reinforcing transverse portion having two side faces which define a width less than a width of the abutment member and substantially equal to a distance between the two pivot-limiting hooks.

5. The mounting structure according to claim 4, wherein the upper wall comprises protrusions projecting inwardly into the retaining opening, the protrusions being in contact with a face of the coupling portion of the clip so as to prevent movement of the coupling portion within the pivot plane.

6. The mounting structure according to claim 4, wherein the coupling portion of the clip comprises a flexible catch member, and the receiving member comprises a catch opening adjacent to the retaining opening and with which the flexible catch member engages.

7. The mounting structure according to claim 1, wherein the upper wall comprises protrusions projecting inwardly into the retaining opening, the protrusions being in contact with a face of the coupling portion of the clip so as to prevent movement of the coupling portion within the pivot plane.

8. The mounting structure according to claim 7, wherein the coupling portion of the clip comprises a flexible catch member, and the receiving member comprises a catch opening adjacent to the retaining opening and with which the flexible catch member engages.

9. The mounting structure according to claim 1, wherein the coupling portion of the clip comprises a flexible catch member, and the receiving member comprises a catch opening adjacent to the retaining opening and with which the flexible catch member engages.

10. The mounting structure according to claim 1, wherein the receiving member comprises a reinforcing front wall which extends perpendicularly to the reference axis, the one pivot stop projecting from a rear face of the reinforcing front wall.

11. A structure for mounting a clip for a writing implement comprising:
a pivotable clip which comprises:
  a stationary coupling portion extending along a reference axis;
  a main body adapted to pivot relative to the coupling portion without deformation, in a pivot plane containing the reference axis, the main body having two sidewalls each comprising a pivot-limiting hook; and
  a resiliently deformable curved portion connecting the main body to the coupling portion, a pivoting of the main body leading to a deformation of the curved portion;
a receiving member receiving the coupling portion of the clip, comprising an abutment member having at least one pivot stop adapted to cooperate with said pivot-limiting hook to limit the pivoting without deformation of the main body;
wherein the abutment member is arranged between the two sidewalls of the main body of the clip and has two lateral abutments adapted to prevent movement of the main body perpendicularly to the pivot plane; and
wherein the two lateral abutments are formed by two side surfaces of said abutment member which are located one on each side of the pivot plane, and the two pivot stops are each formed by a surface which advances towards the pivot plane from an edge of the side surface.

12. The mounting structure according to claim 11, wherein the sidewalls of the clip are formed from a metal sheet, and each pivot-limiting hook is formed by a tab of the metal sheet bent at an edge of a sidewall so that the hook protrudes in the direction of the pivot plane.

13. The mounting structure according to claim 11, wherein the receiving member comprises a base comprising two lateral walls and an upper wall which interconnects the two lateral walls, the receiving member further comprising a retaining opening formed between the two lateral walls and with which the coupling portion of the clip is engaged and immobilized.

14. The mounting structure according to claim 11, wherein the receiving member comprises a reinforcing front wall which extends perpendicularly to the reference axis, the one pivot stop projecting from a rear face of the reinforcing front wall.

15. A structure for mounting a clip for a writing implement comprising:
a pivoting clip which comprises:
  a stationary coupling portion extending along a reference axis;
  a main body adapted to pivot relative to the coupling portion without deformation, in a pivot plane containing the reference axis, the main body having two sidewalls each comprising a pivot-limiting hook; and
  a resiliently deformable curved portion connecting the main body to the coupling portion, a pivoting of the main body leading to a deformation of the curved portion;
a receiving member receiving the coupling portion of the clip, comprising an abutment member having at least one pivot stop adapted to cooperate with said pivot-limiting hook to limit the pivoting without deformation of the main body;
wherein the receiving member comprises a reinforcing front wall which extends perpendicularly to the reference axis, the at least one pivot stop projecting from a rear face of said reinforcing front wall; and
wherein the abutment member is arranged between the two sidewalls of the main body of the clip and has two lateral abutments adapted to prevent movement of the main body perpendicularly to the pivot plane.

16. The mounting structure according to claim 15, wherein the reinforcing front wall comprises a projecting upper part forming an abutment against which a lower surface of the main body of the clip comes in contact when the clip is not under load.

17. A writing implement comprising a barrel extending along a longitudinal axis and a structure for mounting a clip according to claim 16, wherein the receiving member of the mounting structure is integrally formed with a generally tubular member mounted at the rear of the barrel and extending along the longitudinal axis, the generally tubular member comprising a generally cylindrical rear portion from which the receiving member protrudes, the rear portion comprising a wall portion which has an outer surface against which the coupling portion of the clip comes in contact.

18. A clip for a writing implement comprising a coupling portion, a main body, and a resiliently deformable curved portion connecting the main body to the coupling portion, said main body having two sidewalls each comprising a pivot-limiting hook, wherein the clip further comprises a flexible catch member formed with the coupling portion, and in that at least the sidewalls are formed from a metal sheet and each of the two pivot-limiting hooks is formed by a tab of the metal sheet bent at an edge of the sidewall so that the hook protrudes in the direction of the other pivot-limiting hook.

* * * * *